US010276037B2

(12) United States Patent
Meiners

(10) Patent No.: US 10,276,037 B2
(45) Date of Patent: Apr. 30, 2019

(54) METHOD OF ADJUSTING TILLAGE EQUIPMENT REMOTELY FROM OUTSIDE A TRACTOR CAB

(71) Applicant: CNH Industrial America LLC, New Holland, PA (US)

(72) Inventor: Tracey D. Meiners, Mackinaw, IL (US)

(73) Assignee: CNH Industrial America LLC, New Holland, PA (US)

( * ) Notice: Subject to any disclaimer, the term of this patent is extended or adjusted under 35 U.S.C. 154(b) by 93 days.

(21) Appl. No.: 15/375,974

(22) Filed: Dec. 12, 2016

(65) Prior Publication Data

US 2018/0164797 A1 Jun. 14, 2018

(51) Int. Cl.
| | | |
|---|---|---|
| G05D 1/00 | (2006.01) | |
| G08C 17/02 | (2006.01) | |
| A01B 63/00 | (2006.01) | |
| A01B 67/00 | (2006.01) | |
| A01B 69/00 | (2006.01) | |
| A01B 76/00 | (2006.01) | |

(52) U.S. Cl.
CPC ........... G08C 17/02 (2013.01); G05D 1/0011 (2013.01); *A01B 63/00* (2013.01); *A01B 69/00* (2013.01); *A01B 76/00* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 2006/0266853 A1* | 11/2006 | Gamble, II | A01C 15/006 239/661 |
| 2012/0186504 A1* | 7/2012 | Ryder | A01B 79/005 111/174 |

(Continued)

OTHER PUBLICATIONS

"Smartphones and Tablets Integration Into Agricultural and Forestry Machineries", Lorenzo Fantesini, Marco Ferretti, Stefano Marzani, Luca Minin and Alan Pastorelli, University of Modena and Reggio Emilia (6 pages).

*Primary Examiner* — Todd M Melton
*Assistant Examiner* — Jason R Roberson
(74) *Attorney, Agent, or Firm* — Rebecca L. Henkel; Rickard K. DeMille

(57) ABSTRACT

An agricultural apparatus includes an agricultural tractor and at least one agricultural implement. The agricultural tractor has at least one tractor controller and the agricultural implement has at least one implement controller. At least one wireless connection is connected to the at least one tractor controller and/or to the at least one implement controller. The agricultural tractor and/or the at least one agricultural implement has at least one adjustable setting controllable by the at least one tractor controller and/or by the at least one implement controller. A multi-purpose handheld wireless device communicates with the tractor controller and/or the implement controller by way of the wireless connection. The multi-purpose handheld wireless device has at least one application that transmits adjustment instructions to the tractor controller and/or to the implement controller to be carried out upon the at least one adjustable setting.

18 Claims, 2 Drawing Sheets

(56) References Cited

U.S. PATENT DOCUMENTS

2014/0176303 A1* 6/2014 Stratton ................. G08C 17/02
340/5.61
2017/0024107 A1* 1/2017 Reichhardt ............ G08C 17/02

* cited by examiner

METHOD OF ADJUSTING TILLAGE EQUIPMENT REMOTELY FROM OUTSIDE A TRACTOR CAB

BACKGROUND OF THE INVENTION

1. Field of the Invention

The present invention relates to agricultural tractor and implement combinations, and, more particularly, to wireless control of adjustments to agricultural tractor and implement combinations using handheld or wearable electronic devices.

2. Description of the Related Art

Agricultural tractors are used to pull various agricultural implements that are necessary for tilling, seedbed preparation, planting, mowing, raking, harvesting, baling, spraying, and fertilizing. Often, these various agricultural implements have sophisticated control systems involving highly automated functions with extensive integration of the agricultural tractor and implement controls and support systems. Further, the agricultural tractor and implement combination may jointly perform tasks that involve integration of commands, operational settings, and user preferences. Some such agricultural implements may include two or more sections coupled together to perform multiple functions as they are pulled through fields by an agricultural tractor. Agricultural implements of this kind often have multiple settings that may be adjusted in order to optimize performance of the implement in the field. For example, tillage implements may be adjustable in depth of tillage and levelling of the implement. Planters and seeders may be adjustable in seed spacing, seed depth, down pressure, and closing function. Sprayers and applicators may be adjustable in spread and rate of application. Mowers and conditioners may be adjustable in mowing height. Rakes may be adjustable in windrow width and height of the rakes. Balers may be adjustable in target bale size.

Each of these adjustments may be optimized in order to meet the needs of the particular operating conditions and operating needs of the farm. However, the modern farm manager is often not the person operating the agricultural tractor and implement combination, in any one or all of the field preparation, planting, spraying and fertilizing, harvesting, or post-harvest operations. Instead, the modern farm manager may often act as an expert coordinator, for example, by evaluating the performance of a tillage implement by inspecting the seedbed that it produces during operation in comparison to the desired seedbed conditions. Similarly, the modern farm manager may most efficiently make use of his or her expertise in inspecting the condition of a field in the process of being planted, in order to determine adjustments that are needed in the planting or seeding implement.

If the individual in charge of one of these field operations is in fact operating the agricultural tractor and implement combination, he or she must periodically stop the agricultural tractor and inspect the tilled, planted, sprayed, fertilized, or harvested field in order to determine which adjustments need to be made. He or she must then physically adjust the tillage implement, resume the field operation, which may involve driving the agricultural tractor for several hundred feet, and possibly stop again to inspect the field to see if the adjustment was effective. This process is not only inefficient from a productivity standpoint, but also often interferes with the proper operation of the agricultural tractor or implement, which is most efficient and effective when the operation is continuous.

If the individual in charge of one of these field operations is not operating the agricultural tractor and implement combination, he or she may observe the result of the field operation while the operation is ongoing from a position outside the agricultural tractor and implement combination. However, any adjustments to the agricultural implement must then be communicated to the operator of the agricultural tractor and implement combination, which can lead to distraction and error. While it is known to provide for adjustment of agricultural implements from within the cab of the agricultural tractor, the appropriateness of such adjustment still depends on the operator being correctly apprised of how the implement is presently performing.

What is needed in the art, therefore is a way to effectively, quickly, and efficiently adjust the settings of agricultural implements from a position outside of the agricultural tractor and implement combination without interrupting the ongoing field operation and without unduly distracting or burdening the operator of the agricultural tractor and implement combination.

SUMMARY OF THE INVENTION

Embodiments of the present invention provide a system and method that allows a person situated outside the cab of an agricultural tractor and implement combination to make adjustments to the agricultural tractor and/or to the agricultural implement without stopping the agricultural tractor or interrupting the field operation in order to physically adjust the agricultural tractor or implement. The system and method may take advantage of readily available consumer or commercial handheld wireless electronic devices such as a smartphone, smartwatch, mobile computer, or tablet which is then accordingly loaded with an application or applications configured to allow the smartphone, smartwatch, mobile computer, or tablet to wirelessly or telematically transmit adjustment instructions to the agricultural tractor and implement combination. The agricultural tractor and/or agricultural implement may be equipped with one or more wireless or telematic connections, in-cab computers and/or displays, tractor control unit or units, and/or implement control unit or units, and/or wired or wireless bus or other form of intra-vehicle communication, as well as mechanical, pneumatic, hydraulic, electrical, or electronic physical connections between the agricultural tractor and the agricultural implement, which cooperate to control various adjustment settings of the agricultural tractor and/or agricultural implement.

The application or applications of the smartwatch, smartphone, mobile computer, or tablet communicate by way of the one or more wireless or telematic connections of the agricultural tractor and/or agricultural implement with the at least one in-cab computer and/or display, and/or tractor control unit or units, and/or implement control unit or units, in order to communicate the adjustment instructions. The at least one in-cab computer and/or display, and/or tractor control unit or units, and/or implement control unit or units may then use the mechanical, pneumatic, hydraulic, electrical, or electronic connections between the agricultural tractor and the agricultural implement to further transmit adjustment instructions therebetween, depending upon which of the at least one in-cab computer and/or display, and/or tractor control unit or units, and/or implement control unit or units receives the adjustment instructions by way of the wireless or telematic connections of the agricultural tractor and/or agricultural implement, and upon which of the agricultural tractor or agricultural implement is intended to carry out the adjustment instruction.

The smartphone, smartwatch, mobile computer, or tablet according to an embodiment of the present invention is thereby capable of transmitting adjustment instructions to the agricultural tractor and implement combination, which is then capable of effectuating the adjustment in response. This allows the farm manager or other individual in charge of the field operation to directly inspect the tilled, planted, sprayed, fertilized, or harvested field in order to determine which adjustments need to be made to the agricultural tractor or agricultural implement, and then transmit the desired adjustment directly to the agricultural tractor and/or agricultural implement while the field operation is ongoing. The agricultural tractor and/or agricultural implement then makes the adjustments without stopping or otherwise interrupting the field operation, resulting in significant time savings and avoiding otherwise interfering with the agricultural function being performed. Another embodiment of the present invention may allow the farm manager or other individual in charge of field operations to determine adjustments to be made and then transmit the desired adjustments directly to multiple agricultural tractors and/or agricultural implements while field operations are ongoing.

On-the-go adjustments that may be performed according to at least one embodiment of the present invention may include adjustments to tillage implements such as depth of tillage and levelling of the implement, adjustments to planters and seeders such as seed spacing, seed depth, down pressure, and closing function, adjustments to sprayers and applicators such as spread and rate of application, adjustments to the mowing height of mowers and conditioners, adjustments to windrow width and height of rakes, or adjustment to the target bale size of balers, as non-limiting examples. Further adjustments that may be performed according to at least one embodiment of the present invention may also include some functions on the agricultural tractor itself, such as speed, direction, and/or revolutions per minute (RPM) of the engine. In at least one embodiment of the present invention, the operator of the agricultural tractor may be notified of the adjustments to be made, required to confirm the adjustments before they are made, and/or confirm that the adjustments have been made. In at least one other embodiment of the present invention, the operator may not be required to or respond to the adjustments in any way, and may not be notified that any such adjustments are being made.

The system and method according to at least one embodiment of the present invention may download to the smartphone, smartwatch, mobile computer, or tablet live information from the agricultural tractor and/or agricultural implement regarding the current adjustment settings thereof and/or status information regarding the agricultural tractor and/or agricultural implement such as state of fill or performance metrics, as non-limiting examples. In this way, the intended adjustment may be determined in view of the current adjustment settings and/or status of the agricultural tractor and/or agricultural implement.

The invention in one form is directed to an agricultural apparatus including an agricultural tractor and at least one agricultural implement. The agricultural tractor has at least one tractor controller and the at least one agricultural implement has at least one implement controller. The agricultural tractor and/or the at least one agricultural implement has at least one wireless connection connected to the at least one tractor controller and/or to the at least one implement controller. The at least one tractor controller and the at least one implement controller are interconnected wirelessly and/or physically. The agricultural tractor and/or the at least one agricultural implement has at least one adjustable setting controllable by the at least one tractor controller and/or by the at least one implement controller. A multi-purpose handheld wireless device is configured to communicate with the at least one tractor controller and/or the at least one implement controller by way of the wireless connection. The multi-purpose handheld wireless device has at least one application configured to transmit adjustment instructions to the at least one tractor controller and/or the at least one implement controller to be carried out upon the at least one adjustable setting.

The invention in another form is directed to a control system of an agricultural apparatus including an agricultural tractor and at least one agricultural implement. The control system includes at least one tractor controller connected to the agricultural tractor and at least one implement controller connected to the at least one agricultural implement. At least one wireless connection is connected to the at least one tractor controller and/or to the at least one implement controller. The at least one tractor controller and the at least one implement controller are interconnected wirelessly and/or physically. At least one adjustable setting of the agricultural tractor and/or the at least one agricultural implement is controllable by the at least one tractor controller and/or by the at least one implement controller. A multi-purpose handheld wireless device is configured to communicate with the at least one tractor controller and/or with the at least one implement controller by way of the wireless connection. At least one application is loaded on the multi-purpose handheld wireless device and is configured to transmit adjustment instructions to the at least one tractor controller and/or to the at least one implement controller to be carried out upon the at least one adjustable setting.

The invention in yet another form is directed to a method of controlling at least one adjustable setting of at least one agricultural apparatus including at least one agricultural tractor and at least one agricultural implement. The method includes several steps. The first step is connecting at least one tractor controller to the at least one agricultural tractor. The second step is connecting at least one implement controller to the at least one agricultural implement. The third step is connecting at least one in-cab computer and/or display to the at least one tractor controller and/or to the at least one implement controller. The fourth step is connecting at least one wireless connection to the at least one tractor controller, to the at least one implement controller, and/or to the at least one in-cab computer and/or display. The fifth step is interconnecting the at least one tractor controller and the at least one implement controller wirelessly and/or physically. The sixth step is operably linking the at least one adjustable setting of the at least one agricultural tractor and/or the at least one agricultural implement to the at least one tractor controller and/or to the at least one implement controller. The seventh step is configuring a multi-purpose handheld wireless device to communicate with the at least one tractor controller, with the at least one implement controller, and/or with the at least one in-cab computer and/or display by way of the at least one wireless connection. The eighth step is loading at least one application on the multi-purpose handheld wireless device configured to transmit adjustment instructions to the at least one tractor controller, to the at least one implement controller, and/or to the at least one in-cab computer and/or display to be carried out upon the at least one adjustable setting.

An advantage of the present invention is that it allows an individual located outside the cab of an agricultural tractor to make adjustments to the agricultural tractor and/or to the agricultural implement without stopping or otherwise interrupting the field operation, resulting in significant time savings and avoiding otherwise interfering with the agricultural function being performed. A further advantage of the present invention is that it enables a farm manager to control adjustable settings of multiple agricultural tractors and multiple agricultural implements in multiple fields and monitor their performance.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
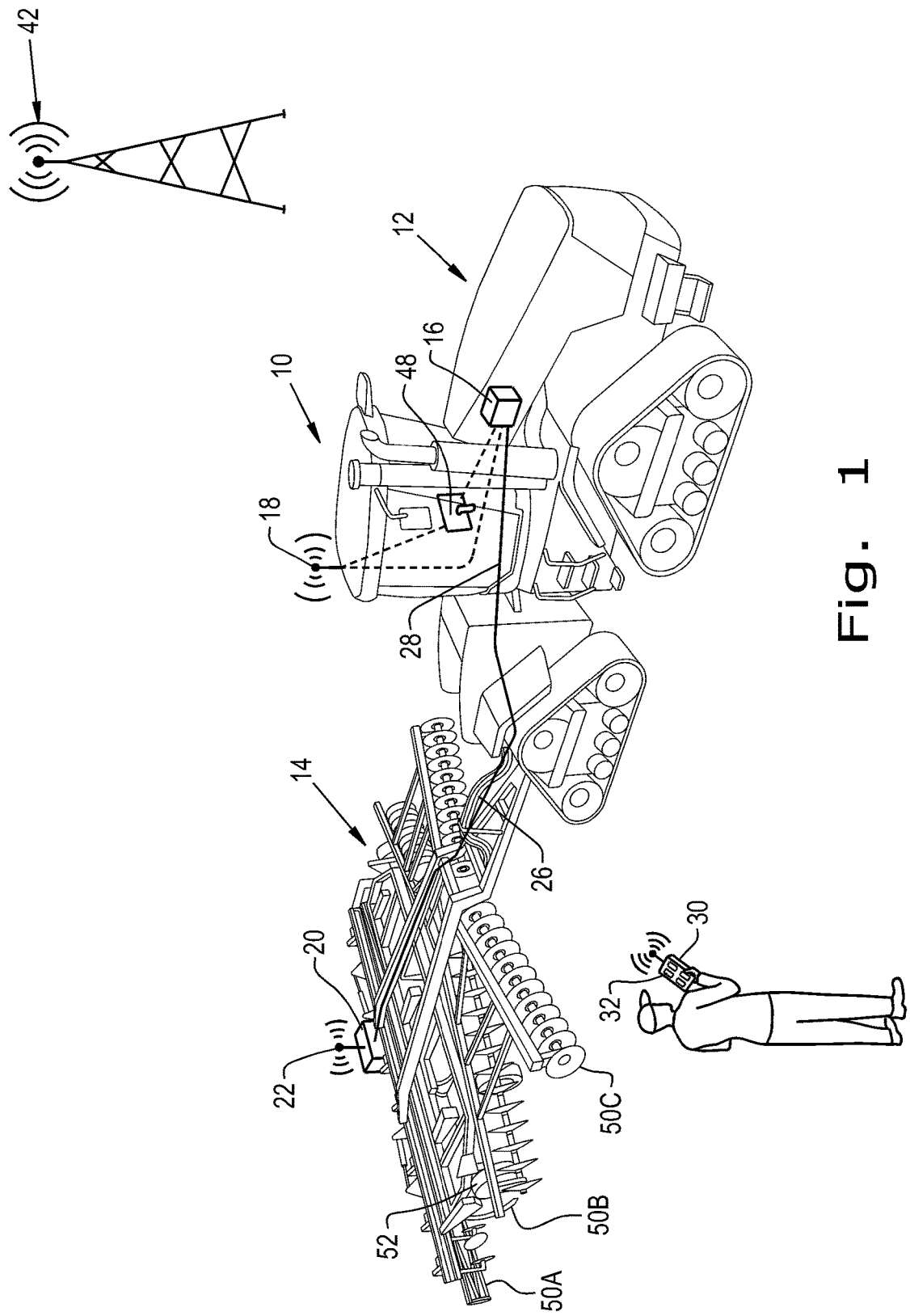
FIG. 1 is an isometric view of an embodiment the present invention, in the form of an agricultural tractor and tillage implement combination controllable in certain adjustments by way of a multi-purpose handheld wireless device.
Figure 2:
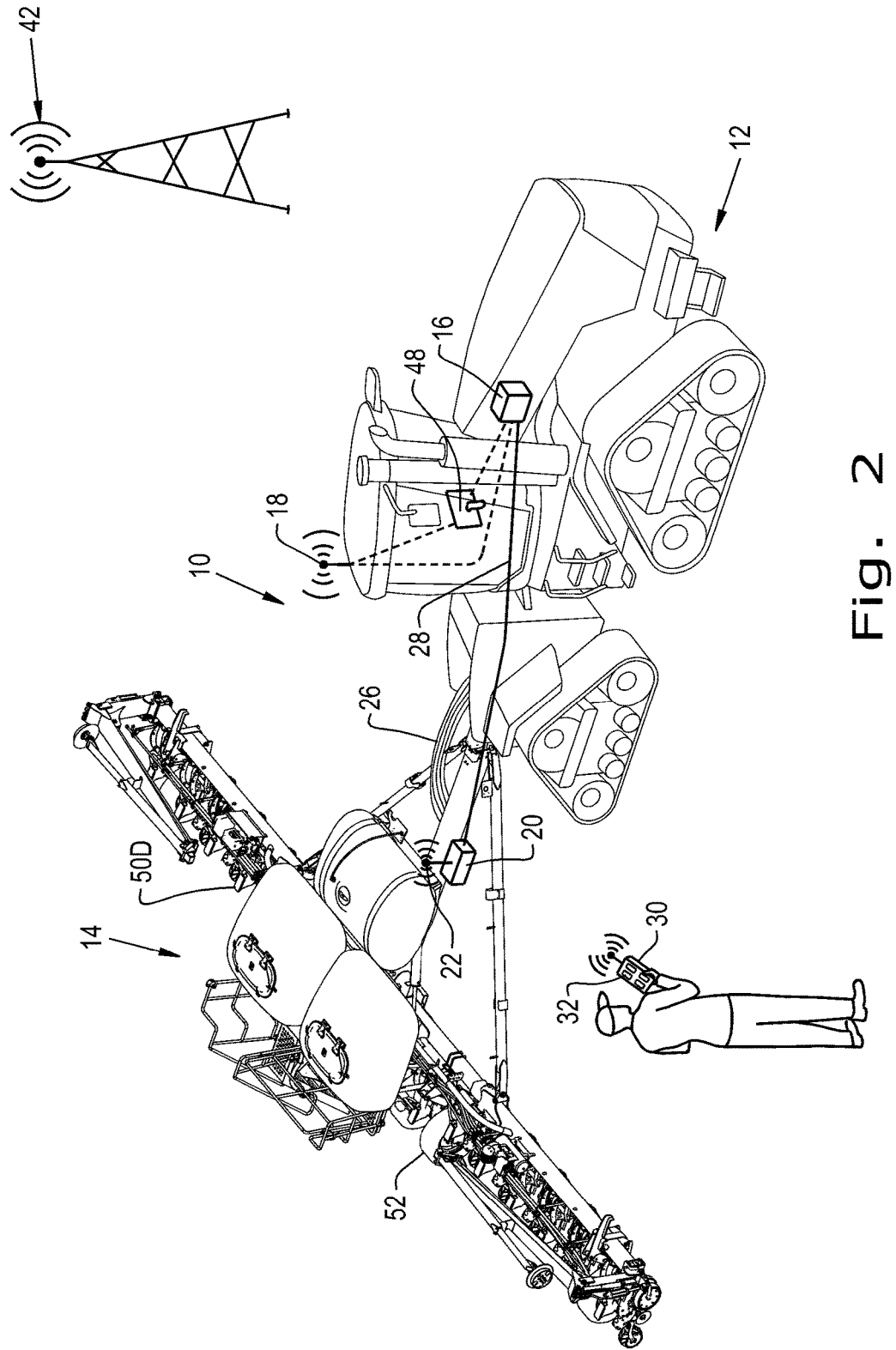
FIG. 2 is an isometric view of an embodiment the present invention, in the form of an agricultural tractor and planter implement combination controllable in certain adjustments by way of a multi-purpose handheld wireless device.

Referring now to the drawings, and more particularly to FIGS. 1 and 2, there is shown embodiments of the present invention used on an agricultural tractor and agricultural implement combination 10. The agricultural tractor 12 is attached to an agricultural implement 14, in order to perform an agricultural function, such as tilling, seedbed preparation, planting, mowing, raking, harvesting, baling, spraying, or fertilizing, as non-limiting examples. In the case of the agricultural implement 14 shown in FIG. 1, the agricultural function is tilling and/or seedbed preparation. In the case of the agricultural implement 14 shown in FIG. 2, the agricultural function is planting.

The agricultural tractor 12 may have one or more tractor control units 16, which may be connected to a tractor wireless connection 18. This tractor wireless connection 18 may be any type of wireless connection capable of transmitting and receiving data, such as cellular, telematic, Personal Area Network (PAN), Wireless Sensor Network (WSN), Wireless Local Area Network (WLAN), or Wireless Wide Area Network (WWAN), as non-limiting examples. The agricultural implement 14 may also have one or more implement control units 20, which may be connected to an implement wireless connection 22. The implement wireless connection 22 may again be any type of wireless connection capable of transmitting and receiving data, as noted above. The agricultural implement 14 is physically attached to the agricultural tractor 12, and is provided with physical connections 26, which may include mechanical, pneumatic, electrical, electronic, and/or hydraulic connections, possibly including a Controller Area Network (CAN) bus and/or other bus communication 28, such as Ethernet. Further, the agricultural implement 14 may also communicate with the agricultural tractor 12 by way of implement wireless connection 22 and tractor wireless connection 18.

FIGS. 1 and 2 further show an operator having a multi-purpose handheld wireless electronic device 30, which may be a multi-purpose handheld wireless electronic device 30 capable of transmitting and receiving data, such as a smartphone, smartwatch, mobile computer, or tablet. The multi-purpose handheld wireless electronic device 30 is capable of communicating with the tractor wireless connection 18 of the agricultural tractor 12, and/or with the implement wireless connection 22 of the agricultural implement 14, again by way of any type of wireless connection capable of transmitting and receiving data, as noted above. This communication may be direct between the multi-purpose handheld wireless electronic device 30 and the tractor wireless connection 18 and/or implement wireless connection 22, or may be by way of telecommunication infrastructure 42 such as cellular, satellite, and/or telematic infrastructure.

The multi-purpose handheld wireless electronic device 30 is provided with at least one application 32 configured to allow the multi-purpose handheld wireless electronic device 30 to transmit adjustment instructions to the tractor wireless connection 18 of the agricultural tractor 12, and/or to the implement wireless connection 22 of the agricultural implement 14. The adjustment instructions may then be communicated to the tractor control unit or units 16 and/or to the implement control unit or units 18. If necessary, the adjustment commands or instructions may be communicated between the tractor control unit or units 16 and the implement control unit or units 18 by way of the physical connections 26. Alternately, the adjustment commands or instructions may if necessary be communicated directly between the tractor control unit or units 16 and the implement control unit or units 18 by way of the tractor wireless connection 18 and the implement wireless connection 22.

In at least one embodiment of the present invention, the adjustment instructions may further be communicated to an in-cab computer and/or display 48, so that an operator of the agricultural tractor 12 may be notified of the adjustments to be made, required to confirm the adjustments before they are made, and/or confirm that the adjustments have been made. The in-cab computer and/or display 48 may further function to coordinate the adjustments by way of the tractor control unit or units 16 and/or the implement control unit or units 18. Any number of adjustments to the agricultural tractor 12 and/or to agricultural tools 50 of the agricultural implement 14 and/or to the agricultural implement 14 itself, may be made using the multi-purpose handheld wireless device 30.

As a non-limiting example, the agricultural implement 14 in the form of a tillage implement as shown in FIG. 1 may be commanded by the multi-purpose handheld wireless device 30 to make adjustments to the depth of tillage of discs 50A, shanks 50B, and/or rolling baskets 50C, using lift wheels 52 or by another mechanism, or to the levelling of the agricultural implement 14 itself. As another non-limiting example, the agricultural implement 14 in the form of a planter as shown in FIG. 2 may be commanded by the multi-purpose handheld wireless device 30 to make adjustments to the seed spacing, seed depth, down pressure, or closing function of planter row units 50D. The agricultural tractor 12 shown in FIGS. 1 and 2 may be commanded by the multi-purpose handheld wireless device 30 to make adjustments to its speed, direction, and/or RPM of the engine, as non-limiting examples. Further non-limiting examples of adjustments that may be commanded by the multi-purpose handheld wireless device 30 in various embodiments of the present invention include adjustments to sprayers and applicators such as spread and rate of application, adjustments to the mowing height of mowers and conditioners, adjustments to windrow width and height of rakes, or adjustment to the target bale size of balers.

The multi-purpose handheld wireless device 30 according to at least one embodiment of the present invention may download live information from the agricultural tractor 12 and/or agricultural implement 14 regarding the current adjustment settings thereof and/or status information regarding the agricultural tractor 12 and/or agricultural implement 14 such as state of fill or performance metrics, as non-limiting examples, so that the intended adjustment may be determined in view of the current adjustment settings and/or status of the agricultural tractor 12 and/or agricultural implement 14.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural apparatus, comprising:
   an agricultural tractor having at least one tractor controller;
   at least one agricultural implement having at least one implement controller;
   at least one of said agricultural tractor and said at least one agricultural implement having a wireless connection connected to at least one of said at least one tractor controller and said at least one implement controller, said at least one tractor controller and said at least one implement controller being interconnected at least one of wirelessly and physically;
   at least one of said agricultural tractor and said at least one agricultural implement having at least one adjustable setting controllable by at least one of said at least one tractor controller and said at least one implement controller;
   a multi-purpose handheld wireless device configured to communicate with at least one of said at least one tractor controller and said at least one implement controller by way of said wireless connection;
   said multi-purpose handheld wireless device having at least one application configured to transmit adjustment instructions to at least one of said at least one tractor controller and said at least one implement controller to be carried out upon said at least one adjustable setting;
   at least one of an in-cab computer and display connected to at least one of said tractor controller, said implement controller, and said wireless connection, at least one of said at least one tractor controller and at least one implement controller being connected to said wireless connection at least one of directly and by way of said at least one of an in-cab computer and display;
   said adjustment instructions being further transmitted to said at least one of said tractor controller and said implement controller by way of said at least one of an in-cab computer and display; and
   said at least one of an in-cab computer and display being configured to:
   notify an operator of said agricultural tractor of said adjustment instructions;
   require confirmation of said adjustment instructions by an operator of said agricultural tractor; and
   carry out said at least one adjustable setting without interrupting an ongoing field operation of said agricultural tractor and said at least one agricultural implement.

2. The agricultural apparatus of claim 1, wherein:
   said multi-purpose handheld wireless device further comprises at least one of a smartphone, smartwatch, mobile computer, and tablet.

3. The agricultural apparatus of claim 1, wherein:
   said multi-purpose handheld wireless device being further configured to communicate with at least one of said tractor controller and said implement controller by way of telecommunication infrastructure.

4. The agricultural apparatus of claim 1, wherein:
   said at least one of an in-cab computer and display being further configured to
   require confirmation by an operator of said agricultural tractor of a change in said at least one adjustable setting responsive to said adjustment instructions.

5. The agricultural apparatus of claim 1, wherein:
   said at least one adjustable setting is carried out without stopping said agricultural tractor and said at least one agricultural implement.

6. The agricultural apparatus of claim 1, wherein:
   said at least one application being further configured to request and receive live information from at least one of said tractor controller and said implement controller regarding at least one of a current state of said at least one adjustable setting and current status information of at least one of said agricultural tractor and said at least one agricultural implement.

7. The agricultural apparatus of claim 1, wherein:
   said at least one adjustable setting being at least one of:
   depth of tillage or levelling of a tillage implement;
   position of at least one harrow or attachment of a tillage implement;
   seed spacing, seed depth, down pressure, or closing function of a planting implement;
   spread or rate of application of an applicator implement;
   mowing height of a mowing implement;
   windrow width or height of rakes of a raking implement;
   target bale size of a baling implement; and
   speed, direction, or engine revolutions per minute of said agricultural tractor.

8. A control system of an agricultural apparatus including an agricultural tractor and at least one agricultural implement, comprising:
   at least one tractor controller connected to the agricultural tractor;
   at least one implement controller connected to the at least one agricultural implement;
   at least one wireless connection connected to at least one of said at least one tractor controller and said at least one implement controller, said at least one tractor controller and said at least one implement controller being interconnected at least one of wirelessly and physically;
   at least one adjustable setting of at least one of the agricultural tractor and the at least one agricultural implement being controllable by at least one of said at least one tractor controller and said at least one implement controller;

a multi-purpose handheld wireless device configured to communicate with at least one of said at least one tractor controller and said at least one implement controller by way of said wireless connection;

at least one application loaded on said multi-purpose handheld wireless device and configured to transmit adjustment instructions to at least one of said at least one tractor controller and said at least one implement controller to be carried out upon said at least one adjustable setting;

at least one of an in-cab computer and display connected to at least one of said tractor controller, said implement controller, and said wireless connection, at least one of said at least one tractor controller and at least one implement controller being connected to said wireless connection at least one of directly and by way of said at least one of an in-cab computer and display;

said adjustment instructions being further transmitted to said at least one of said tractor controller and said implement controller by way of said at least one of an in-cab computer and display; and said at least one of an in-cab computer and display being configured to:
 notify an operator of said agricultural tractor of said adjustment instructions;
 require confirmation of said adjustment instructions by an operator of said agricultural tractor; and
 carry out said at least one adjustable setting without interrupting an ongoing field operation of said agricultural tractor and said at least one agricultural implement.

9. The control system of claim 8, wherein:
said multi-purpose handheld wireless device further comprises at least one of a smartphone, smartwatch, mobile computer, and tablet.

10. The control system of claim 8, wherein:
said multi-purpose handheld wireless device being further configured to communicate with at least one of said tractor controller and said implement controller by way of telecommunication infrastructure.

11. The control system of claim 8, wherein:
said at least one of an in-cab computer and display being further configured to:
 require confirmation by an operator of the agricultural tractor of a change in said at least one adjustable setting responsive to said adjustment instructions.

12. The control system of claim 8, wherein:
said at least one adjustable setting is carried out without stopping the agricultural tractor and the agricultural implement.

13. The control system of claim 8, wherein:
said at least one application being further configured to request and receive live information from at least one of said tractor controller and said implement controller regarding at least one of a current state of said at least one adjustable setting and current status information of at least one of the agricultural tractor and the agricultural implement.

14. The control system of claim 8, wherein:
said at least one adjustable setting being at least one of:
 depth of tillage or levelling of a tillage implement;
 position of at least one harrow or attachment of a tillage implement;
 seed spacing, seed depth, down pressure, or closing function of a planting implement;
 spread or rate of application of an applicator implement;
 mowing height of a mowing implement;
 windrow width or height of rakes of a raking implement;
 target bale size of a baling implement; and
 speed, direction, or engine revolutions per minute of the agricultural tractor.

15. A method of controlling at least one adjustable setting of at least one agricultural apparatus including at least one agricultural tractor and at least one agricultural implement, comprising:
 connecting at least one tractor controller to the at least one agricultural tractor;
 connecting at least one implement controller to the at least one agricultural implement;
 connecting at least one of an in-cab computer and display to at least one of said at least one tractor controller and said at least one implement controller;
 connecting at least one wireless connection to at least one of said at least one tractor controller, said at least one implement controller, and said at least one of an in-cab computer and display;
 interconnecting said at least one tractor controller and said at least one implement controller at least one of wirelessly and physically;
 operably linking the at least one adjustable setting of at least one of the at least one agricultural tractor and the at least one agricultural implement to at least one of said at least one tractor controller and said at least one implement controller;
 configuring a multi-purpose handheld wireless device to communicate with at least one of said at least one tractor controller, said at least one implement controller, and said at least one of an in-cab computer and display by way of said at least one wireless connection;
 loading at least one application on said multi-purpose handheld wireless device configured to transmit adjustment instructions to at least one of said at least one tractor controller, said at least one implement controller, and said at least one of an in-cab computer and display to be carried out upon said at least one adjustable setting; and
 configuring said at least one of an in-cab computer and display to:
  notify an operator of the at least one agricultural tractor of said adjustment instructions;
  require confirmation of said adjustment instructions by an operator of the at least one agricultural tractor; and
  carry out said at least one adjustable setting without interrupting an ongoing field operation of said agricultural tractor and said at least one agricultural implement.

16. The method of claim 15, wherein:
said multi-purpose handheld wireless device further comprises at least one of a smartphone, smartwatch, mobile computer, and tablet; and
said multi-purpose handheld wireless device being further configured to communicate with at least one of said at least one tractor controller, said at least one implement controller, and said at least one of an in-cab computer and display by way of telecommunication infrastructure.

17. The method of claim 15, further comprising the step of:

requiring confirmation by an operator of the at least one agricultural tractor of a change in said at least one adjustable setting responsive to said adjustment instructions.

18. The method of claim 15, further comprising the steps of:

further configuring said at least one application to request and receive live information from at least one of said at least one tractor controller, said at least one implement controller, and said at least one of an in-cab computer and display regarding at least one of a current state of said at least one adjustable setting and current status information of at least one of the at least one agricultural tractor and the at least one agricultural implement.

* * * * *